United States Patent [19]
Nicolas

[11] 3,934,467
[45] Jan. 27, 1976

[54] SPINNER FLOWMETER WITH ISOLATED BEARINGS

[75] Inventor: Yves Nicolas, Versailles, France

[73] Assignee: Schlumberger Technology Corporation, New York, N.Y.

[22] Filed: July 1, 1974

[21] Appl. No.: 485,058

[30] Foreign Application Priority Data
Apr. 9, 1974 France .............................. 74.12371

[52] U.S. Cl. ................................... 73/155; 73/229
[51] Int. Cl.² ......................................... E21B 47/10
[58] Field of Search ............ 73/151, 152, 155, 198, 73/229; 166/66, 250

[56] References Cited
UNITED STATES PATENTS

| | | | |
|---|---|---|---|
| 2,599,901 | 6/1952 | Damas .............................. | 73/229 X |
| 2,607,221 | 8/1952 | Babson et al. ........................ | 73/155 |
| 2,939,626 | 6/1960 | Birman .......................... | 416/174 X |
| 3,039,302 | 6/1962 | Willis ................................... | 73/155 |
| 3,630,078 | 12/1971 | Bonnet ............................... | 73/155 |

Primary Examiner—Jerry W. Myracle
Attorney, Agent, or Firm—Ernest R. Archambeau, Jr.; William R. Sherman; Stewart F. Moore

[57] ABSTRACT

In the representative embodiment of the present invention disclosed herein, a well bore flowmeter is provided with a fluid-driven spinner which is uniquely mounted on the closed end of a hollow shaft that is coaxially disposed over a spindle and rotatably journalled thereon by one or more bearings located in the enclosed annular chamber defined between the shaft and the spindle. To protect the bearings, the chamber is filled with a lubricant and the chamber is communicated with the exterior of the flowmeter only by way of a multi-directional passage which effectively serves to block the entry of well bore debris as the flowmeter is operating. As a further protection for the bearings, one or more valve members are also preferably provided for blocking communication with the bearing chamber as the flowmeter is moved into and out of a well bore. These valve members are preferably actuated by the extension and retraction of a centralizer provided for centering the flowmeter as it is operated in a well bore.

35 Claims, 6 Drawing Figures

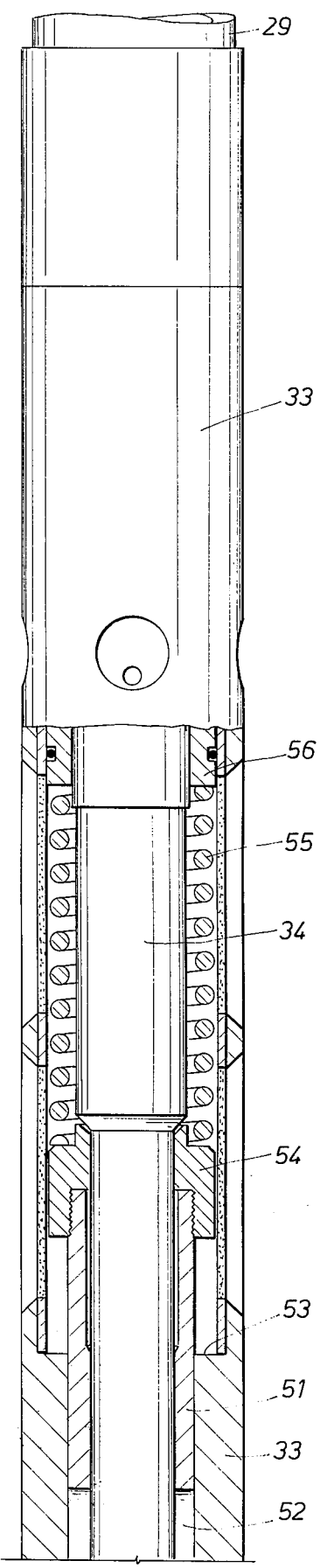
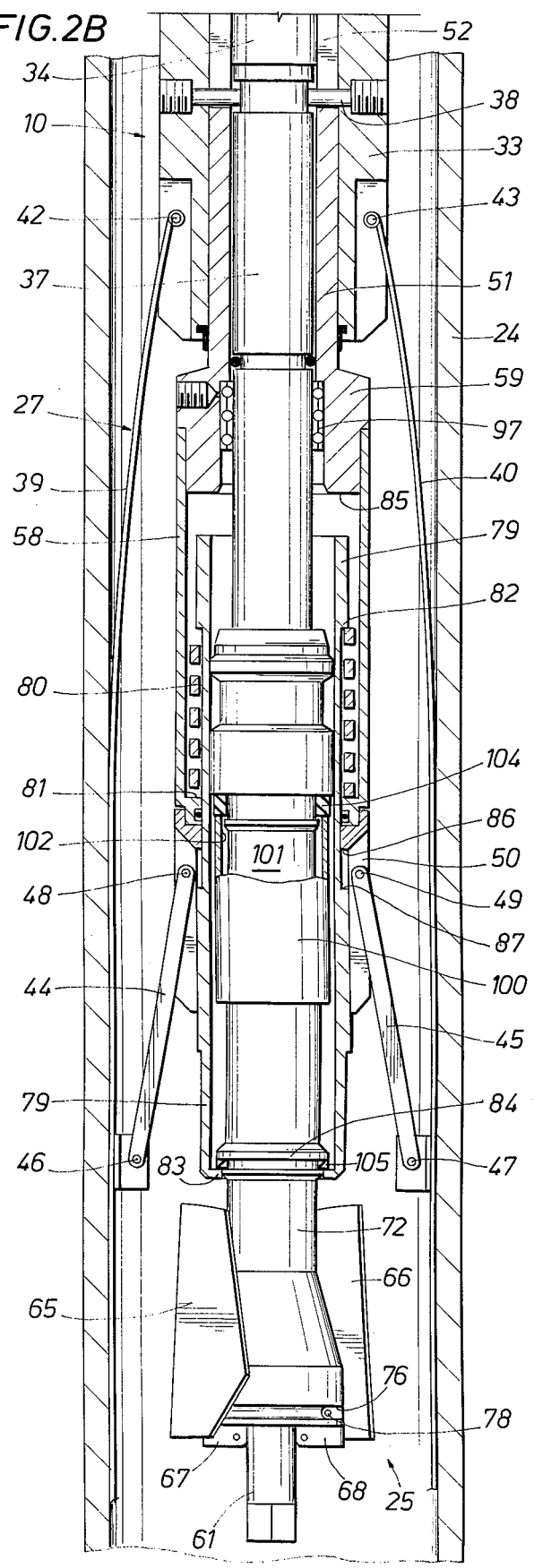

SPINNER FLOWMETER WITH ISOLATED BEARINGS

As described in Pat. No. 3,630,078, one of the most successful techniques presently employed for determining the flow rate of fluids flowing in a well bore is to successively pass a so-called "spinner-type" flowmeter tool at selected constant speeds through the fluid-filled well bore. By successively recording the resulting rotational speeds of the flowmeter spinner at the corresponding depth locations of the tool, a continuous flow-survey or fluid-velocity log will be obtained from which the flow rates of the well bore fluids at different depth intervals of the well bore can be readily determined. Thus, where the well being surveyed is a production well having two or more producing intervals, the resulting log will clearly indicate the respective velocities or flow rates of the connate fluids which are being produced from each of the several producing intervals. On the other hand, where the well is an injection well in which fluids are being injected simultaneously into two or more formation intervals, the resulting flow survey will show what portion of the injection fluid is entering each formation interval.

Those skilled in the art will, of course, appreciate that the rotational speed of the spinner in a flowmeter of this nature is simply a linear function of the apparent or relative velocity of the well bore fluids in relation to the tool. Thus, at low flow rates, the spinner will inherently turn at correspondingly-low speeds so long as the well bore fluids are moving at a sufficient velocity to still turn the spinner. It is apparent, therefore, that for a given spinner, the minimum "operating threshold" for such a flowmeter is directly related to the amount of rotational friction which must be overcome before the spinner can turn. Accordingly, as fully explained in the aforementioned Bonnet patent, it was found that the unique magnetic suspension arrangement shown there significantly reduced the static and dynamic friction affecting the rotation of the flowmeter spinner.

Although flowmeters arranged in accordance with the Bonnet patent have met with considerable success, it has been found nevertheless that their loose-fitting magnetically-suspended spinners become unreliable, if not ineffective, in substantially deviated or non-vertical well bore interval. Attempts to use bushings or bearings of different types for maintaining these spinner shafts coaxially centered in the tool have not been too successful, however, in view of the additional friction. Moreover, fluid-borner debris such as sand grains or other solid particles will often enter the clearance spaces around or in such bearings and impair, if not totally disrupt, the operation of these bearings as well as other closely fitted movable elements of the flowmeter. It will, however, be recognized that these bearings cannot be totally enclosed without passing the spinner shaft through at least one fluid seal which will, of course, impose an unwanted frictional restraint on the rotating shaft. Those skilled in the art will appreciate, therefore, that no completely satisfactory solution has been proposed heretofore for effectively overcoming these significant problems so as to provide a spinner-type flowmeter which can be satisfactorily operated in debris-bearing fluids within inclined well bores and with a minimum of frictional drag on the spinner shaft.

Accordingly, it is an object of the present invention to provide a new and improved well bore flowmeter having a velocity-responsive flow-measuring element that is rotatably journalled on one or more bearings which are cooperatively isolated from the flowing well bore fluids in such a manner as to reliably protect them from both the corrosive effects of such fluids and any debris carried thereby.

This and other objects of the present invention are attained by uniquely arranging a velocity-responsive impeller or multi-bladed spinner on the closed-end portion of a hollow rotatable shaft which is coaxially disposed around a longitudinally extending depending portion of the flowmeter body and operatively journalled thereon by one or more bearings cooperatively arranged in a substantially enclosed annular chamber defined by the extended body portion and the interior walls of the hollow shaft. To lubricate the bearings as well as to protect them from any foreign matter carried by the well bore fluids, the chamber is filled with a lubricant and communicated with the well bore by a multi-directional or tortuous passage cooperatively arranged for trapping any fluid-borne debris which might otherwise enter the open passage end and pass on into the bearing chamber. In the preferred embodiment of the present invention, these objects are further attained by also providing at least one valve member which normally closes the communicating passage and is cooperatively opened only when the flowmeter is to be operated by means such as an actuator which is responsive to the extension of a centralizer arranged for maintaining the flowmeter centered in the well bore.

The novel features of the present invention are set forth with particularity in the appended claims.

The invention, together with further objects and advantages thereof, may be best understood by way of the following description of exemplary apparatus employing the principles of the invention as illustrated in the accompanying drawings, in which:

FIGS. 2A and 2B are successive enlarged cross-sectional views depicting the lower portion of the new and improved flowmeter shown in FIG. 1 while it is being moved through a small-diameter production string;

Figure 1:
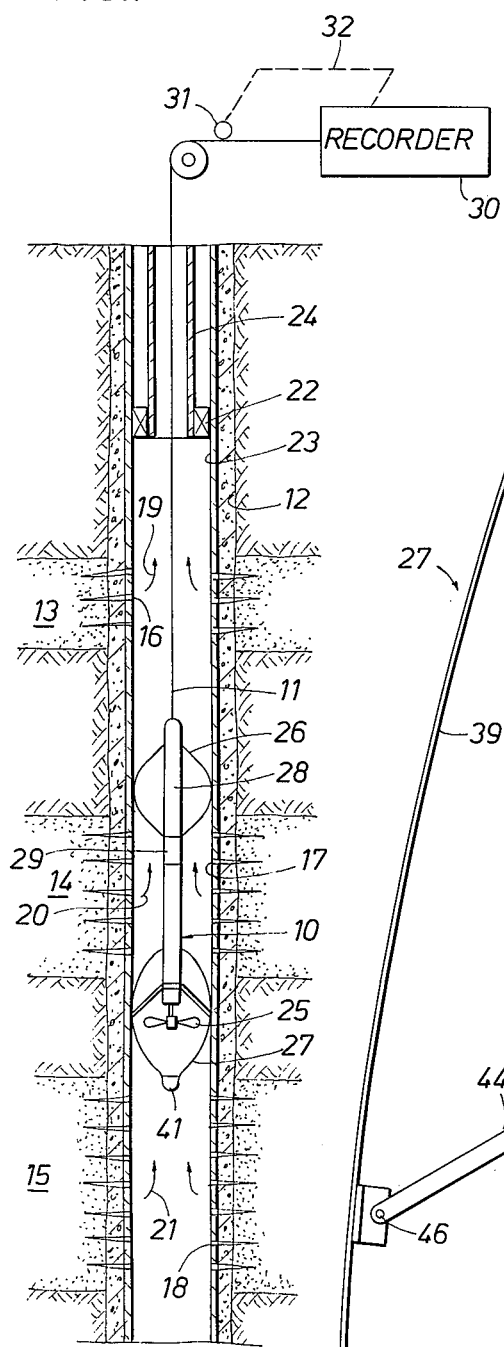
FIG. 1 shows a preferred embodiment of a spinner-type flowmeter incorporating the principles of the present invention as it will appear while operating in a multi-zoned production well.

Turning to FIG. 1, a preferred embodiment of a spinner-type flowmeter 10 arranged in accordance with the principles of the present invention is depicted as it will appear while suspended from an electrical logging cable 11 and moving along a cased well bore 12. It will, of course, be appreciated that the new and improved flowmeter 10 can be successfully employed without regard to the direction in which the well bore fluids are flowing. However, simply for purposes of illustration, the well bore 12 is depicted in FIG. 1 as a typical production well that penetrates one or more producing formations 13–15 which have been respectively perforated, as at 16–18, for allowing connate fluids such as oil, gas or water contained in each formation into enter the well bore 12, as at 19–21, and flow together to the surface for collection. As is customary, a typical production packer 22 is set in the casing 23 above the formations 13–15 and a string of small-diameter production tubing 24 is coupled to the packer for providing communication between the isolated interval of the well bore 12 and the surface.

As will be subsequently described in greater detail, the new and improved flowmeter 10 includes a multi-bladed propeller or velocity-responsive spinner 25 which is rotatively coupled to the lower end of the tool. To maintain the flowmeter 10 in a centered position in the casing 23, bow-spring centralizers, as shown generally at 26 and 27, are mounted at spaced intervals on the tool, with the springs of the uniquely arranged lower centralizer preferably being cooperatively disposed around the spinner 25 to prevent it from striking the casing even in highly deviated well bores.

Although other arrangements can, of course, be provided, the flowmeter 10 preferably includes electronic circuitry 28 such as that described in the aforementioned Bonnet patent (which is hereby incorporated by reference herein) for providing electrical digital or analog signals which are functionally representative of the flow rates or velocities of the several well bore fluids as at 19–21. A collar locator 29 is also preferably included with the tool 10 and is coupled to the cable 11 for providing electrical depth-correlation signals as the flowmeter successively passes collars in the string of casing 23 in the well bore 12.

As previously described, the usual technique for operating a spinner-type flowmeter, as at 10, is to simply pass the tool at different travel speeds through the isolated interval of the well bore 12 against the direction of the fluid flow and then use the resulting measurements of the rotational speed of the spinner 25 for determining the overall flow rates in each zone. To accomplish this, the cable 11 is spooled on a winch (not shown) at the surface and cooperatively arranged for moving the tool 10 at selected travel speeds either upwardly or downwardly in the well bore 12. To record the output signals of the flowmeter 10 and the collar locator 29 corresponding to the successive depth positions of the tool in the well bore 12, typical surface indicating-and-recording apparatus, such as a CRT or galvanometer recorder 30, is electrically connected to the cable 11 and adapted to be proportionally driven in response to its upward and downward movements by means such as a calibrated cable-engaging measuring wheel 31 that is operatively coupled to the recorder as by a pulse generator or a suitable mechanical linkage 32.

Turning now to FIGS. 2A and 2B, successive cross-sectional views are shown of the lower section of the flowmeter 10 below the collar locator 29 as the new and improved flowmeter will appear while moving through a small-diameter pipe string such as the production tubing 24. Inasmuch as different mechanical arrangements can be employed by those skilled in the art without departing from the broad concepts of the present invention, the drawings have been somewhat simplified by omitting various minor constructional details to emphasize the significant and unique aspects of the invention. As illustrated, the body of the lower section of the flowmeter 10 is preferably formed of an outer tubular member 33 which is coaxially spaced around a smaller inner member 34 and secured thereto, as by threads 35, on an enlarged upper end portion 36 of the inner member. Instead of simply extending the inner member 34, it is preferred for purposes of assembly to dependently couple a second inner member 37 to the lower end of the first inner member by means such as one or more laterally extending pins or bolts, as at 38, which are projected through the wall of the outer member 33 and releasably secured to the second inner member.

As one aspect of the present invention, the lower centralizer 27 is uniquely arranged for providing a number of functions which either singly or collectively contribute to the overall success of the new and improved flowmeter 10. Accordingly, one significant function of the centralizer 27 is to maintain at least the lowermost portion of the flowmeter 10 centralized in the casing 23 as the tool is being moved along the well bore 12 below the packer 22 but without imposing an undue restraint on the downward movements of the tool. To accomplish this, the new and improved centralizer 27 includes at least three greatly elongated and somewhat arcuate or slightly bowed leaf springs, as at 39 and 40, which are distributed uniformly around the lower portion of the flowmeter 10 and respectively extended upwardly from a central member or common nose piece 41 (FIG. 1) positioned well below the spinner 25 to individual transversely oriented pivots, as at 42 and 43, located at uniform intervals around the lower portion of the outer body member 33 (FIG. 2B).

Inasmuch as the upper ends of the centralizer springs, as at 39 and 40, are respectively fixed to the outer body member 33, means are provided for selectively urging the bow springs outwardly. In the preferred manner of accomplishing this, the outer ends of a corresponding number of rigid arms, as at 44 and 45, are each coupled to pivots, as at 46 and 47, located somewhat above the mid-points of each of the bow springs 39 and 40; and the arms are respectively extended upwardly to suitable pivots, as at 48 and 49, which are symmetrically distributed around an enlarged-diameter collar 50 that is coaxially disposed around the lowermost portion of the lower body member 37.

To impose a downwardly directed force on the several arms, as at 44 and 45, a downwardly biased elongated mandrel 51 is coaxially mounted around the inner body members 34 and 37 and adapted for longitudinal movement between an upper position as determined, for example, by the engagement of the pins 38 with the bottom edges of a corresponding number of longitudinal slots, as at 52, in the mandrel and a lower position as determined by the upper face 53 of an inward enlargement of the outer body member 33 and the enlarged upper head 54 of the mandrel. In the preferred manner of providing a downwardly acting biasing force on the mandrel 51, a stout coil spring 55 is coaxially mounted around the inner body member 34 within the outer body member 33 and maintained in compression between the enlarged mandrel head 54 and a downwardly facing shoulder or, preferably, an adjusting nut 56 which is cooperatively mounted on the inner body member by threads 57 of sufficient length to permit at least limited adjustments to be made in the position of the nut. As best seen in FIG. 2B, the downwardly acting biasing force of the spring 55 on the mandrel 51 is preferably transferred to the collar 50 by dependently coupling an elongated tubular member 58 to the enlarged lower end 59 of the mandrel and engaging the lower end of this tubular member with the upper end of the slidable collar. Accordingly, it will be recognized that the combined spring forces of the bow springs, as at 39 and 40, and the compression spring 55 are effective for urging the collar 50 downwardly to move the lower ends of the rigid links, as at 44 and 45, outwardly against the bow springs.

Figure 4:
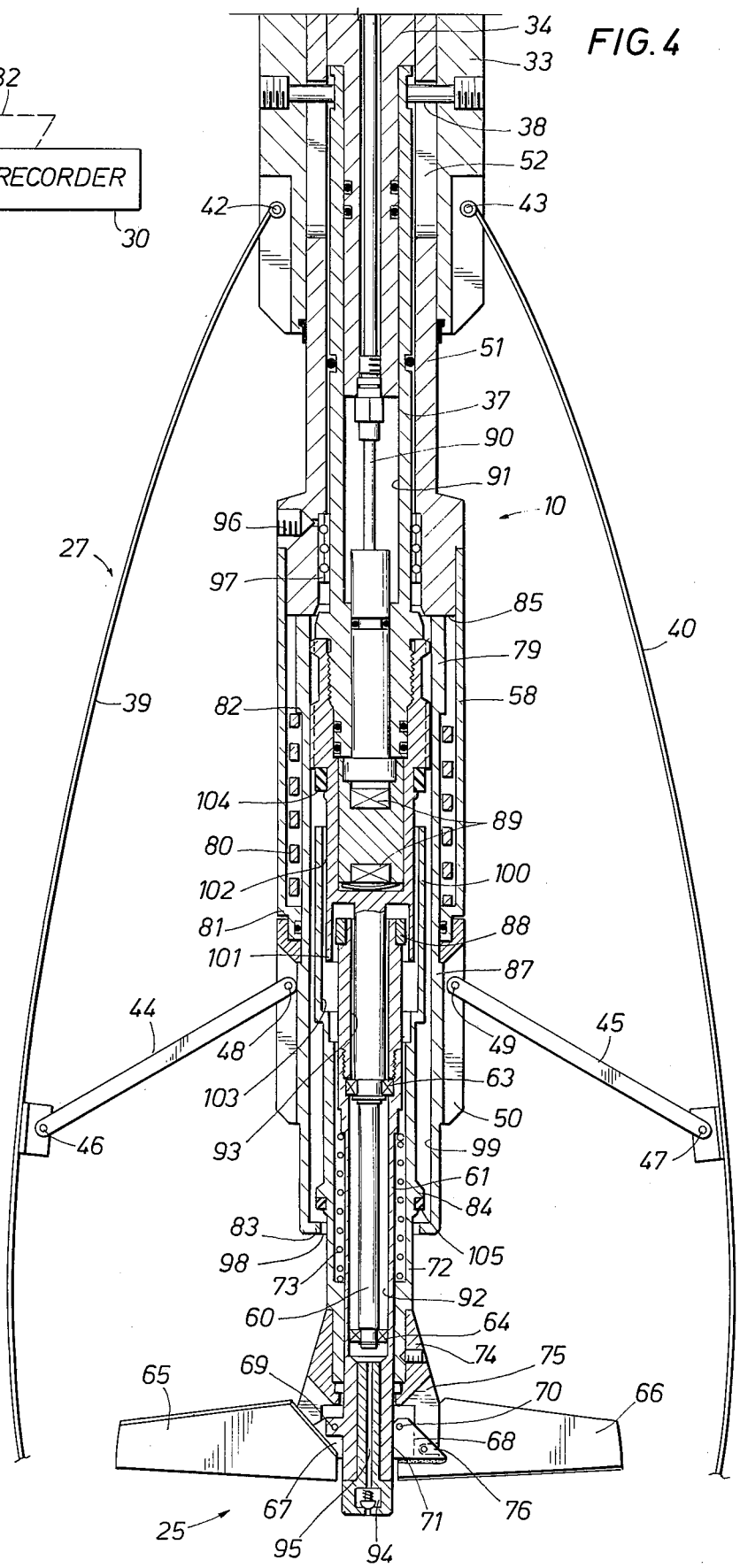
FIG. 4 is similar to FIGS. 2B and 3B but illustrates the corresponding lower portion of the flowmeter as it is operating in a cased well bore interval.

As another significant aspect of the present invention, the lower end of the inner body member 37 is appropriately shaped as best seen in FIG. 4 for defining an axially elongated spindle 60 on which a hollow shaft 61 having a closed lower end wall 62 is cooperatively journalled by means such as a pair of longitudinally spaced ball or roller bearings 63 and 64. Inasmuch as it is preferred that the spinner 25 be of a maximum diameter commensurate with the size of the casing 23, the spinner is provided with two or more elongated blades, as at 65 and 66, which are pivotally mounted at uniform intervals around the lower end of the hollow shaft 61 and cooperatively arranged for selective movement between their respective retracted or running-in positions shown in FIG. 2B and their extended or operating positions shown in FIG. 4. Accordingly, to adapt the spinner blades 65 and 66 for movement between their extended and retracted positions, the inboard end of each of the blades is preferably secured to the lower edge of a vertically aligned or generally upright and outwardly projecting support plate or link, as at 67 and 68, and the upper and inboard corner of each of the links is pivotally coupled, as at 69 and 70, to the hollow shaft 61. To stabilize the several spinner blades 65 and 66 in their respective unfolded positions, the inwardly directed base or edge, as at 71, of each of the blade-support links, as at 68, is complementally shaped for abutment against the adjacent exterior surface of the hollow shaft 61 when the blades are extended to their operating positions depicted in FIG. 4.

It will, therefore, be recognized that the movement of the spinner blades 65 and 66 between their extended and retracted positions must be coordinated with the extension and retraction of the bow springs as at 39 and 40. To accomplish this, an actuating member such as an elongated tube 72 is coaxially mounted around the hollow shaft 61 and cooperatively arranged for limited longitudinal movement in relation to the shaft. A light spring, as at 73, is cooperatively arranged between opposed shoulders on the shaft 61 and the tubular blade-positioning member 72 for normally urging the latter member downwardly. The blade-positioning member 72 is provided with an enlarged lower head 74 which, in the preferred embodiment of the flowmeter 10, is operatively coupled to the spinner blades, as at 65 and 66, by providing a number of longitudinal slots, as at 75, in the head which are respectively arranged to be slidably disposed over the outer portions of the several blade-support links, as at 67 and 68. An outwardly opening circumferential groove 76 is formed around the enlarged head 74 and cooperatively arranged for loosely receiving transversely oriented pivots, as at 77 and 78, which are respectively mounted on the outer portions of the blade-support links as at 67 and 68.

Accordingly, when the blade-positioning member 72 is moved downwardly by the compression spring 73, the spinner blades, as at 65 and 66, will respectively swing downwardly to their extended positions as shown in FIG. 4. Conversely, it will be recognized that upward movement of the blade-positioning member 72 in relation to the hollow shaft 61 will be effective for simultaneously swinging the blades 65 and 66 upwardly about their respective pivots 69 and 70 to their retracted positions illustrated in FIG. 2B. To shift the blade-positioning member 72 upwardly against the biasing force of the spring 73 as the centralizer springs, as at 39 and 40, are being retracted, an elongated tubular member 79 is coaxially disposed around the blade-positioning member and extended upwardly through the collar 50 and the depending member 58 and exterior of the inner body member 37. A fairly stout compression spring 80 is coaxially disposed between opposed shoulders 81 and 82 on the depending tubular member 58 and the elongated tubular member 79, respectively, and operatively arranged for shifting the elongated tubular member 79 upwardly whenever the collar 50 is moved upwardly. To shift the blade-positioning member 72 upwardly in relation to the shaft 61 as the centralizer springs 39 and 40 are being retracted, the lower end of the elongated tubular member 79 is inwardly enlarged to define a shoulder 83 which is cooperatively located in relation to an outwardly enlarged shoulder 84 on the blade-positioning member 72 for raising the latter member a sufficient distance to fully retract the spinner blades, as at 65 and 66, before the centralizer springs are fully collapsed against the flowmeter 10.

Accordingly, it will be appreciated that when the centralizer springs 39 and 40 are fully retracted against the flowmeter 10 as illustrated in FIGS. 2A and 2B, the rigid arms 44 and 45 will have been moved to a nearly erect position for supporting the collar 50 against the downwardly directed biasing force which is imposed thereon by the spring 55 through the mandrel 51 and its depending sleeve 58. Moreover, in this fully retracted position of the flowmeter 10, the force of the fairly stout compression spring 80 will now be effective for urging the elongated tubular member 79 upwardly with sufficient force against the shoulder 84 to support the blade-positioning member 72 in its depicted elevated position for retaining the spinner blades 65 and 66 in their respective folded or retracted positions.

It should be recognized that in the "running-in" position of the flowmeter 10, the stout compression spring 55 will, at best, be imposing only very small outwardly directed forces against the bow springs 39 and 40 in view of the nearly vertical positions of the rigid arms as at 44 and 45; and, therefore, the only significant outwardly directed forces then acting on the wall of the tubing string 24 will be the limited flexural spring forces induced by the retraction or flattening of the bow springs. Thus, although the arms 44 and 45 will fully support the collar 50 against the downward force of the stout spring 55, the centralizer 27 will impose only a limited degree of frictional restraint which will oppose the movements of the flowmeter 10 through the production tubing 24.

Figure 3A:
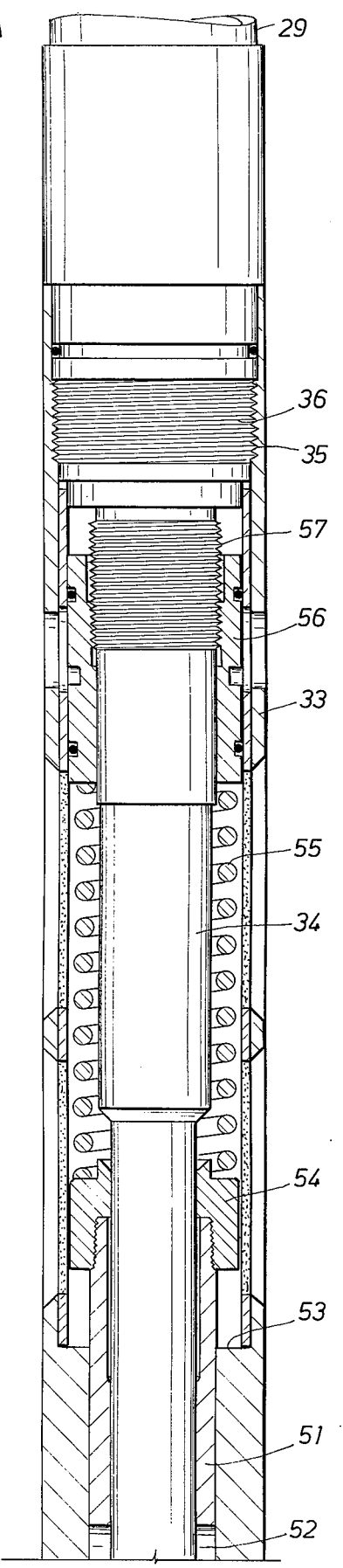
FIGS. 3A and 3B are similar to FIGS. 2A and 2B respectively but depict the flowmeter as it is either emerging from or re-entering the production string.
Figure 3B:
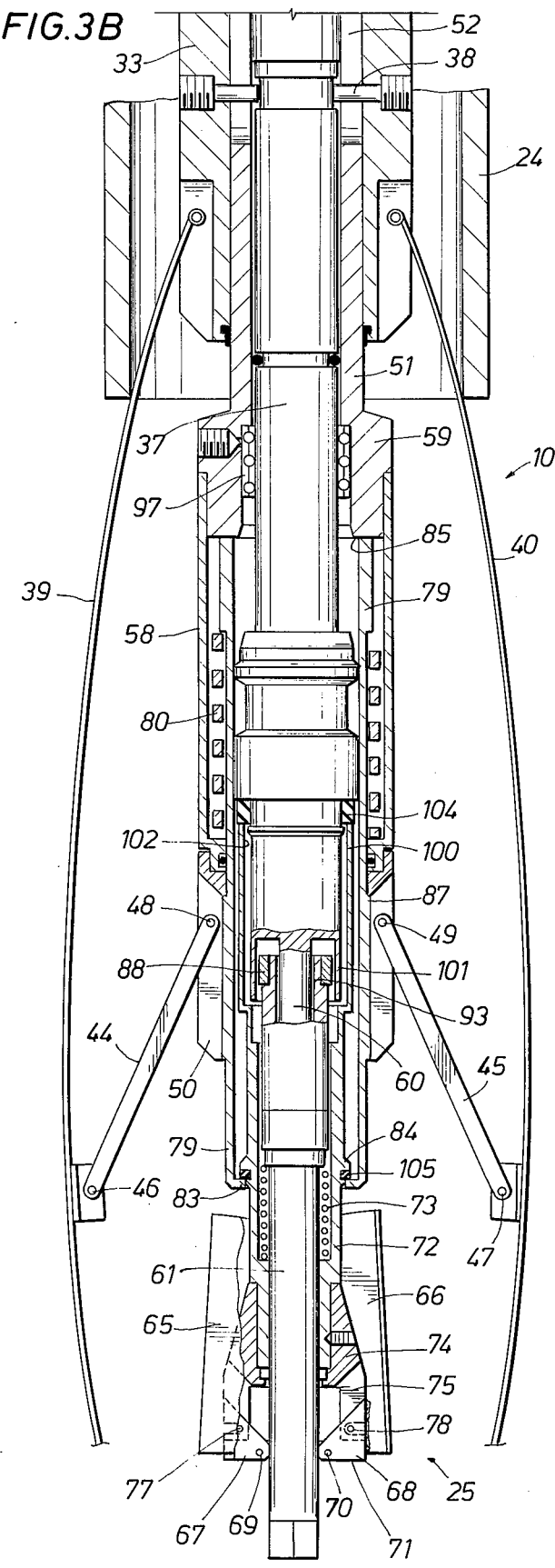

Turning now to FIGS. 3A and 3B, the lower portion of the flowmeter 10 is shown as it is emerging from the lower end of the production tubing 24 into the isolated interval of the well bore 12 below the packer 22. As illustrated, the spring 55 is now effective for urging the collar 50 downwardly as the lower ends of the rigid arms, as at 44 and 45, begin moving outwardly to expand the several centralizer members as at 39 and 40. Of particular interest, it will be noted that as the mandrel 51 is urged downwardly by the stout spring 55, the fairly stout spring 80 will remain slightly compressed for supporting the blade-positioning member 72 until a downwardly facing shoulder 85 defined by the lower end of the mandrel contacts the upper end of the elongated tubular member 79 as an abutment 86 on the collar 50 also contacts an upwardly facing exterior shoulder 87 on the tubular member. Once this occurs, the fairly stout spring 80 will then be effectively immobilized or deactivated so that further downward travel of the mandrel 51 in response to the force of the stout spring 55 will now simultaneously shift the collar 50 and the elongated member 79 downwardly in relation to the body member 37. It will, of course, be recognized that as the collar 50 is moved further downwardly, the lower ends of the rigid arms, as at 44 and 45, will be swung upwardly and outwardly about their respective pivots 48 and 49 on the collar by the accompanying expansion of the centralizer springs, as at 39 and 40.

Accordingly, as will be recognized by a comparison of FIGS. 3B and 4, by the time that the centralizer members, as at 30 and 40, are fully expanded, the elongated member 79 will have been moved downwardly a sufficient distance to disengage the shoulder 83 on its lower end from the external shoulder 84 around the blade-positioning member 72. Thus, as best seen in FIG. 4, the downward movement of the elongated member 79 by the mandrel 51 will be more than adequate for enabling the spring 73 to then shift the blade-positioning member 72 downwardly in relation to the hollow shaft 61 and simultaneously swing the spinner blades, as at 65 and 66, downwardly and outwardly to their respective extended or operating positions.

It will, of course, be appreciated that once the spinner blades, as at 65 and 66, are extended, relative movement of well bore fluids past the blades will be effective for freely rotating the hollow shaft 61 about the bearings 63 and 64 on the spindle 60. Thus, in keeping with the aforementioned Bonnet patent, one or more magnets, as at 88, are cooperatively arranged on the upper end of the rotatable shaft 61 for inducing proportional electrical signals in a sensing coil, as at 89, which, in the preferred embodiment of the present invention, is wound about a transversely oriented axis and cooperatively connected to electrical conductors, as at 90, extended upwardly through suitable conductor seals in a passage 91 in the inner body members 34 and 37 for connection to the circuitry 28 (FIG. 1).

As still another aspect of the present invention, it should be particularly noted in FIG. 4 that the upper and lower shaft bearings 63 and 64 are fully enclosed within the hollow shaft 61 and that the only communication with the enlarged annular space or chamber 92 surrounding the bearings is by way of the relatively narrow annular clearance gap 93 defined between the upper portions of the shaft and the spindle 60. Thus, the enlarged bearing chamber 92 can be readily filled with a suitable lubricant (not shown) to fully protect the bearings 63 and 64 during the operation of the flowmeter 10.

Although other arrangements can, of course, be employed without departing from the scope of the present invention, it is preferred to provide a suitable "Zerk" fitting or the like, as at 94, in the lower end 62 of the hollow shaft 61 and communicate this normally closed valve fitting with the bearing chamber 92 by way of a passage 95. By arranging a normally closed port 96 in the lower portion of the mandrel 51, it can be assured that a lubricant introduced by way of the normally closed valve fitting 94 will in time fill the spaces above the fitting and then flow out of the port. It should be noted in passing that by locating a so-called "linear bearing", as at 97, on the mandrel next to the port 96, this bearing will also be adequately lubricated to facilitate the longitudinal travel of the mandrel 51 in relation to the inner body member 37.

It will, of course, be appreciated from FIG. 4 that as the new improved flowmeter 10 is being operated in a well bore, as at 12, fluid-borne debris particles such as sand and the like can readily pass through the small annular gap 98 between the end of the inwardly turned shoulder 83 and the exterior of the blade-positioning member 72. Thus, although the annular chamber 99 defined between the blade-positioning member 72 and the internal wall of the elongated tubular member 79 will be substantially if not altogether filled with the excess lubricant from the bearing chamber 92, it is quite possible for fluid-borne debris to ultimately be driven into the bearing chamber and damage the bearings 63 and 64 in time. Accordingly, to be further assured that the bearing chamber 92 is well isolated from the chamber 99, in the preferred embodiment of the new and improved flowmeter 10 the upper end of the tubular blade-positioning member 72 is extended, as at 100, a substantial distance above the upper end of the shaft 61 and a depending tubular portion or skirt, as at 101, on the inner body member 37 is coaxially disposed within the tubular extension and extended downwardly around the upper end of the hollow shaft.

In this manner, the upwardly directed extension 100 and the downwardly directed skirt 101 together with the narrow shaft clearance space 93 cooperate to define a multi-directional or tortuous communication passage, as shown at 102 generally, between the inner and outer chambers 92 and 99 for effectively preventing the unwanted entry of foreign matter in the well bore fluids into the bearing chamber. Moreover, should any fluid-borne debris manage to enter the upper end of the tortuous passage 102, an enlarged space 103 below the tubular skirt 101 will serve as an effective collection point for trapping the debris.

It will be recognized, of course, that although the chambers 92 and 99 as well as the intercommunicating passage 102 are preferably filled with a light-weight oil of relatively low viscosity, the greater density of most well bore liquids as well as their velocity will be operative for retaining the oil in at least most of the outer chamber 99 even though the lower end of the chamber 99 is open. Since only the upper end of the inner bearing chamber 92 is open, there will, of course, be no loss of oil from this chamber or the tortuous passage 102.

Those skilled in the art will, of course, appreciate that as the flowmeter 10 is being moved through the small-diameter production string 24 (FIGS. 1 and 2B), there will be a substantial increase in the velocity of the well bore fluids, as at 19–21, passing the flowmeter. Thus, any fluid-borne debris will be driven against the lower end of the flowmeter 10 with considerable velocity. Accordingly, as another significant aspect of the present invention, means are provided for closing off at least the bearing chamber 92 so long as the flowmeter 10 is not being operated. In the preferred manner of accomplishing this, valve means are provided such as a typical seal ring 104 which is mounted around the inner body member 37 and cooperatively arranged to be sealingly engaged with the upper end of the tubular extension 100 when it is moved to its elevated position for closing the outer end of the tortuous passage 102. Similarly, it is preferred that the new and improved flowmeter 10 also include additional valve means such as a typical seal ring 105 which is cooperatively mounted on the shoulder 84 and arranged for engagement by the shoulder 83 as the elongated tubular member 79 is shifted to its elevated position shown in FIG. 2B. It will be appreciated, therefore, that when the centralizer 27 is fully retracted, the seals 104 and 105 will respectively cooperate for blocking entrance of fluid-borne debris into the inner and outer chambers 92 and 99 as well as the passage 102. Undue loss of the lubricant in the outer chamber 99 will also be at least minimized by virtue of the seal 105.

Accordingly, it will be recognized that the new and improved flowmeter 10 of the present invention is particularly adapted for measuring the flow rates of debris-bearing well bore fluids. By virtue of its unique arrangement, the hollow shaft 61 is rotatably journalled on the spindle 60 by the well lubricated bearings 63 and 64 and the rotation of the shaft is substantially unimpeded. Moreover, since the enclosed bearing chamber 92 is communicated with the well bore 12 solely by way of the tortuous passage 102 and the outer chamber 99, fluid-borne debris entering the outer chamber will be effectively precluded from entering the isolated chamber. Those skilled in the art will also appreciate that this unique arrangement serves to pressure balance the rotatable shaft 61 either without requiring a fluid seal around the shaft or exposing the bearings 63 and 64 to the deleterious effects of well bore fluids and fluid-borne debris.

As a further guard against the unwanted entry of fluid-borne debris, the new and improved flowmeter 10 also includes upper and lower valves as respectively represented by the seals 104 and 105 and the associated coengaging portions on the members 79 and 100 which together cooperate to close off the inner and outer chambers 92 and 99 whenever the flowmeter is in a small-diameter pipe string. Although actuation of these valve elements can be accomplished in other manners, it is preferred to cooperatively intercouple them to the centralizer 27 as described for selectively opening and closing communication with the chambers 92 and 99 in response to the extension and retraction of the centralizer.

It will also be recognized that the centralizer 27 is uniquely arranged for centering the flowmeter 10 even in inclined well bore intervals. Thus, in an inclined well bore, the several rigid arms, as at 44 and 45, will cooperate to support the vertical component of the weight of the flowmeter 10 since the arms are coupled together and must move as a unit. As a result, in any orientation of the flowmeter 10, the centralizer springs, as at 39 and 40, will always remain against the casing since no one arm, as at 44, can move independently of the other arms, as at 45.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A well tool adapted for providing measurements representative of the flow rate of fluids in a well bore and comprising:
   a body adapted for suspension in a well bore and including a lower portion providing an axially extending spindle member having an unsupported terminal end;
   fluid-driven impeller means including a hollow shaft member coaxially disposed around said spindle member and having a closed lower end spaced below said terminal end of said spindle member for defining an upright lubricant chamber between said members and above said closed lower end of said shaft member, upper and lower bearing means coaxially disposed between said members in said lubricant chamber and cooperatively arranged for journalling said shaft member for rotation about said spindle member in response to the relative movement of well bore fluids past said impeller means;
   means on said body cooperatively defining passage means communicating said lubricant chamber with the exterior of said body and including at least one multi-directional portion adapted for blocking the movement of unwanted substances through said passage means into said lubricant chamber; and
   centralizer means on said body and including a plurality of wall-engaging members cooperatively arranged at circumferentially spaced intervals around said body and adapted for simultaneous lateral movement between retracted inward positions adjacent to said body and extended outward positions for centering said body in a well bore of at least a selected diameter.

2. The well tool of claim 1 further including:
   valve means operable in response to said lateral movements of said centralizing members for closing said passage means upon movement of said centralizing members toward their said retracted positions and for opening said passage means upon movement of said centralizing members toward their said extended positions.

3. The well tool of claim 1 wherein said impeller means further include:
   a plurality of impeller blades symmetrically arranged around said shaft member and respectively having their inboard ends movably coupled thereto for pivotal movement between radially extended operating positions and substantially upright retracted positions adjacent to said shaft member; and
   blade-positioning means operable in response to said lateral movements of said centralizing members for pivoting said impeller blades inwardly to their said retracted positions upon movement of said centralizing members toward their said retracted positions and for pivoting said impeller blades outwardly to their said operating positions upon movement of said centralizing members toward their said extended positions.

4. The well tool of claim 1 wherein said impeller means further include a plurality of impeller blades symmetrically arranged around said shaft member and respectively having their inboard ends movably coupled thereto for pivotal movement between radially extended operating positions and substantially upright retracted positions adjacent to said shaft member; and further including:
   valve means cooperatively arranged for selectively controlling communication through said passage means; and
   actuating means operable in response to said lateral movement of said centralizing members for pivoting said impeller blades outwardly to their said operating positions and operating said valve means to open said passage means upon outward movement of said centralizing members toward their said extended positions and for pivoting said impeller blades inwardly to their said retracted positions and operating said valve means to close said passage means against the entrance of unwanted substances upon inward movement of said centralizing members toward their said retracted positions.

5. The well tool of claim 4 further including:

means on said body defining an outer lubricant chamber around said shaft member adapted to be communicated with the exterior of said body and with said upright lubricant chamber by way of said passage means; and second valve means cooperatively coupled to said actuating means and operable thereby for communicating said outer lubricant chamber with the exterior of said body upon outward movement of said centralizing members toward their said extended positions and for isolating said outer lubricant chamber from the exterior of said body upon inward movement of said centralizing members toward their said retracted positions.

6. The well tool of claim 5 further including:

circuit means on said body cooperatively arranged for producing electrical signals representative of the rotational speed of said impeller means.

7. A well tool adapted for providing measurements representative of the flow rate of fluids in a well bore and comprising:

a body adapted for suspension in a well bore and including a depending axially-aligned spindle member having an unsupported terminal end;

fluid-driven impeller means including a hollow shaft member coaxially disposed around said spindle member and having a closed lower end spaced below said terminal end of said spindle member for defining a lubricant chamber between said members and above said closed lower end of said shaft member, upper and lower bearings disposed in said lubricant chamber and cooperatively arranged for supporting said shaft member on said spindle member for rotation thereabout, and a plurality of impeller blades symmetrically arranged around said shaft member and respectively having their inboard ends operatively coupled thereto for pivotal movement between substantially upright retracted inactive positions and radially extended operating positions for rotatively driving said shaft member at a rotational speed representative of the relative velocity of well bore fluids passing said impeller blades;

means cooperatively arranged on said body for defining a tortuous passage for communicating said lubricant chamber with the exterior of said body;

centralizing means on said body and including a plurality of upright bow-spring members circumferentially spaced around said body, first means cooperatively coupling the upper ends of each of said bow-spring members to said body for pivotal movement relative thereto, and second means movable on said body between spaced upper and lower positions and cooperatively coupled to another portion of each of said bow-spring members for enabling lateral movement of a selected outer portion of each of said bow-spring members between a retracted position when said second means are in one of said spaced positions and an outwardly extended wall-engaging position when said second means are in the other of said spaced positions; and blade-positioning means cooperatively arranged between said impeller blades and said second means and operable upon movement thereof for pivoting said impeller blades inwardly to their said retracted positions upon movement of said second means toward said one spaced position and for pivoting said impeller blades outwardly to their said operating positions upon movement of said second means toward said other spaced position.

8. The well tool of claim 7 further including:

circuit means on said body cooperatively arranged for producing electrical signals representative of the rotational speed of said impeller means.

9. The well tool of claim 7 wherein said second means include:

a slidable member cooperatively arranged on said body for movement thereon between said spaced upper and lower positions, and a corresponding number of linking members cooperatively intercoupling said slidable member respectively to each of said other portions of said bow-spring members for at least moving said bow-spring members inwardly to their said retracted positions upon movement of said slidable member toward said one spaced position.

10. The well tool of claim 9 wherein said linking members are rigid and further including:

biasing means normally urging said slidable member toward said other position for transmitting at least a portion of the force of said biasing means through said rigid linking members and outwardly against said outer portions of said bow-spring members.

11. The well tool of claim 9 wherein said blade-positioning means include:

a blade-positioning member operatively intercoupled between each of said impeller blades and said slidable member and cooperatively arranged for movement relative to said body for pivoting said impeller blades inwardly to their said retracted positions upon movement of said slidable member toward said one spaced position and for pivoting said impeller blades outwardly to their said operating positions upon movement of said slidable member toward said other spaced position.

12. The well tool of claim 11 wherein said linking members are rigid and further including:

biasing means normally urging said slidable member toward said other position for transmitting at least a portion of the force of said biasing means through said rigid linking members and outwardly against said outer portions of said bow-spring members.

13. The well tool of claim 12 wherein the lower ends of each of said bow-spring members are joined together below said impeller means for providing a guard around said impeller blades.

14. The well tool of claim 11 further including:

valve means responsive to movements of said blade-positioning member for selectively closing said passage means upon movement of said impeller blades and said bow-spring members toward their respective retracted positions and for selectively opening said passage means upon movement of said impeller blades and said bow-spring members towards their respective extended positions.

15. The well tool of claim 14 further including:

circuit means on said body cooperatively arranged for producing electrical signals representative of the rotational speed of said impeller means;

surface means adapted for providing at least indications representative of said electrical signals; and an electrical suspension cable connected to said body for moving said body through a well bore and having conductor means intercoupling said circuit means and said surface means for transmitting said electrical signals.

16. A well tool adapted for providing measurements representative of the flow rate of fluids in a well bore and comprising:

a body adapted for suspension in a well bore and including a depending axially aligned spindle member having an unsupported terminal end;

fluid-driven impeller means including a hollow shaft member coaxially disposed around said spindle member and having a closed lower end spaced below said terminal end of said spindle member for defining a lubricant chamber between said members and above said closed lower end of said shaft member, upper and lower bearings disposed in said lubricant chamber and cooperatively arranged for supporting said shaft member on said spindle member for rotation thereabout, and a plurality of impeller blades symmetrically arranged around said shaft member and respectively having their inboard ends operatively coupled thereto for pivotal movement between substantially upright retracted inactive positions and radially extended operating positions for rotatively driving said shaft member at a rotational speed representative of the relative velocity of well bore fluids passing said impeller blades;

blade-positioning means including a tubular blade positioning member coaxially disposed around said shaft member and adapted for movement relative thereto between spaced upper and lower positions, a plurality of links intercoupling said blade-positioning member and each of said impeller blades and cooperatively arranged for pivoting said impeller blades inwardly to their said retracted positions upon movement of said blade-positioning member to its said upper position and for pivoting said impeller blades outwardly to their said operating positions upon movement of said blade-positioning member to its said lower position, and first biasing means normally urging said blade-positioning member toward its said lower position;

tool-centralizing means including a plurality of elongated bow-spring members distributed longitudinally about said body and around said impeller blades, means pivotally coupling the upper ends of each of said bow-spring members to said body above said impeller blades, means coupling the lower ends of each of said bow-spring members together below said impeller blades, a slidable collar coaxially disposed about said body and adapted for movement relative thereto between a lower position above said impeller blades and a higher upper position, second biasing means normally urging said collar toward its said lower position, and a corresponding number of rigid arms respectively having their opposite ends pivotally intercoupled between an intermediate portion of each of said bow-spring members and inclined upwardly and inwardly to said collar for transmitting the force of said second biasing means downwardly and outwardly through said rigid arms against each of said bow-spring members to move said bow-spring members outwardly to an extended position as said collar is moved downwardly toward its said lower position by said second biasing means and for transmitting an opposing force upwardly and inwardly through said rigid arms against said collar to move said collar toward its said upper position against said biasing means as said bow-spring members are moved inwardly to a retracted position adjacent to said body; and actuating means cooperatively arranged between said blade-positioning member and said collar for moving said blade-positioning member upwardly toward its said upper position as said collar is moved toward its said upper position and for moving said blade-positioning member downwardly toward its said lower position as said collar is moved toward its said lower position.

17. The well tool of claim 16 further including:

an upright tubular extension cooperatively arranged on said blade-positioning members and extended on above the upper end of said shaft member to define a restricted entrance into said lubricant chamber so long as said blade-positioning member is below its said upper position; and sealing means cooperatively arranged for engagement between said tubular extension and said body only upon movement of said blade-positioning member to its said upper position for blocking said restricted entrance into said lubricant chamber against the entry of unwanted substances so long as said impeller blades are in their retracted positions.

18. The well tool of claim 16 further including: a depending tubular extension cooperatively arranged on said body and coaxially disposed around the upper portion of said shaft member for defining a multi-directional passage communicating said lubricant chamber with the exterior of said body.

19. The well tool of claim 16 further including:

a depending tubular extension cooperatively arranged on said body and coaxially disposed around the upper portion of said shaft member for defining a multi-directional passage in communication with said lubricant chamber;

an upright tubular extension cooperatively arranged on said blade-positioning member and extended coaxially in relation to said depending tubular extension and above its lower end for extending the length of said multi-directional passage; and sealing means cooperatively arranged for engagement between said upright tubular extension and said body only upon movement of said blade-positioning member to its said upper position for selectively blocking said multi-directional passage so long as said impeller blades are in their retracted positions.

20. The well tool of claim 19 wherein said upright tubular extension is exterior of said depending tubular extension.

21. A well tool adapted for providing measurements representative of the flow rate of fluids in a well bore and comprising:

a body adapted for suspension in a well bore and including a depending axially aligned spindle member having an unsupported terminal end;

fluid-driven impeller means including a hollow shaft member coaxially disposed around said spindle member and having a closed lower end spaced below said terminal end of said spindle member for defining an inner lubricant chamber between said members and above said closed lower end of said shaft member, upper and lower bearings disposed in said inner lubricant chamber and cooperatively arranged for supporting said shaft member on said spindle member for rotation thereabout, and a plurality of impeller blades symmetrically arranged around said shaft member and respectively having their inboard ends operatively coupled thereto for pivotal movement between substantially upright retracted inactive positions and radially extended operating positions for rotatively driving said shaft member at a rotational speed representative of the relative velocity of well bore fluids passing said impeller blades;

blade-positioning means including a tubular blade-positioning member coaxially disposed around said shaft member and adapted for movement relative thereto between spaced upper and lower positions, a plurality of links intercoupling said blade-positioning member and each of said impeller blades and cooperatively arranged for pivoting said impeller blades inwardly to their said retracted positions upon movement of said blade-positioning member to its said upper position and for pivoting said impeller blades outwardly to their said operating positions upon movement of said blade-positioning member to its said lower position, and first biasing means normally urging said blade-positioning member toward its said lower position;

tool-centralizing means including a plurality of elongated bow-spring members distributed longitudinally about said body and around said impeller blades, means pivotally coupling the upper ends of each of said bow-spring members to said body above said impeller blades, means coupling the lower ends of each of said bow-spring members together below said impeller blades, a slidable collar coaxially disposed about said body above said impeller blades and adapted for movement relative thereto, and a corresponding number of upwardly and inwardly inclined rigid arms respectively having their opposite ends pivotally intercoupled between an intermediate portion of each of said bow-spring members and said collar; and actuating means including a first actuating member slidably mounted on said body above said collar and adapted for longitudinal movement thereon between upper and lower positions, second biasing means between said body and said first actuating member and cooperatively arranged for urging said first actuating member downwardly against said collar to force said rigid arms downwardly and outwardly against each of said bow-spring members outwardly to an extended position as said first actuating member is moved toward its said lower position by said second biasing means and for retarding the upward movement of said first actuating member as said bow-spring members are contracted inwardly to a retracted position to force said rigid arms upwardly and inwardly to raise said collar until said first actuating member reaches its said upper position, a second actuating member slidably mounted on said body between said blade-positioning member and said first actuating member and defining an outer lubricant chamber in communication with the exterior of said body, third biasing means between said first and second actuating members normally urging said second actuating member upwardly in relation to said first actuating member, a first set of opposed shoulders on said second actuating member and said blade-positioning member cooperatively arranged for abutment as said first actuating member is moved above its said lower position and imposes an upwardly directed force through said third biasing means on said second actuating means sufficient for raising said blade-positioning member against the force of said first biasing means to said upper position of said blade-positioning member, and a second set of opposed shoulders on said first and second actuating members cooperatively arranged for being urged into abutment by said third biasing means until said first actuating member is moved further toward its said upper position after said blade-positioning member has reached its said upper position.

22. The well tool of claim 21 further including:
an upright tubular extension cooperatively arranged on said blade-positioning member and extended on above the upper end of said shaft member to define a restricted entrance into said inner lubricant chamber so long as said blade-positioning member is below its said upper position; and
sealing means cooperatively arranged for engagement between said tubular extension and said body only upon movement of said blade-positioning member to its said upper position for blocking said restricted entrance into said inner lubricant chamber against the entry of unwanted substances.

23. The well tool of claim 21 further including:
a depending tubular extension cooperatively arranged on said body and coaxially disposed around the upper portion of said shaft member for defining a multi-directional passage intercommunicating said inner and outer lubricant chambers.

24. The well tool of claim 21 further including:
a depending tubular extension cooperatively arranged on said body and coaxially disposed around the upper portion of said shaft member for defining a first portion of a multi-directional passage intercommunicating said inner and outer lubricant chambers;
an upright tubular extension cooperatively arranged on said blade-positioning member and extended coaxially in relation to said depending tubular extension and above its lower end for defining a second portion of said multi-directional passage; and
sealing means cooperatively arranged for engagement between said upright tubular extension and said body only upon movement of said blade-positioning member to its said upper position for selectively blocking said multi-directional passage so long as said impeller blades are in their retracted positions.

25. The well tool of claim 24 wherein said upright tubular extension is exterior of said depending tubular extension.

26. The well tool of claim 24 further including second sealing means cooperatively arranged between said first set of opposed shoulders for closing communication between said outer lubricant chamber and the exterior of said body upon movement of said blade-positioning member to its said upper position.

27. A well tool adapted for providing measurements representative of the flow rate of fluids in a well bore and comprising:
 a body adapted for suspension in a well bore and including means for defining a spindle having an unsupported outboard end portion;
 fluid-driven impeller means including a hollow hub member having a closed outboard end portion and an open inboard end portion coaxially disposed around said spindle, and bearing means in the enclosed space defined between said closed end portion of said hub member and around siad spindle and cooperatively arranged for journalling said impeller means to rotate about said spindle in response to the relative movement of well bore fluids past said impeller means;
 passage means communicating said enclosed space with well bore fluids exterior of said body and having at least one change of direction adapted for trapping foreign matter borne by such fluids;
 centralizer means on said body and adapted for movement from a retracted position to an extended position for centering said well tool in a well bore of at least a selected diameter;
 valve means cooperatively arranged in said passage means for selectively controlling communication therethrough; and
 actuating means cooperatively arranged between said valve means and said centralizer means for selectively opening said valve means only upon movement of said centralizer means toward said extended position.

28. The well tool of claim 27 wherein said actuating means are further arranged for selectively closing said valve means upon movement of said centralizer means toward said retracted position.

29. A well tool adapted for providing measurements representative of the flow rate of fluids in a well bore and comprising:
 a body adapted for suspension in a well bore and including a depending axial spindle member having an unsupported outboard end portion;
 fluid-driven impeller means including a hollow shaft member having a closed outboard end coaxially disposed around said spindle member for defining an inner lubricant chamber between said members above said closed shaft end, a plurality of impeller blades symmetrically arranged around said shaft member and having their respective inboard ends operatively coupled thereto for pivotal movement between laterally extended operating positions and generally longitudinal retracted positions, bearing means cooperatively mounted around said spindle member in said inner lubricant chamber for operatively journalling said shaft member for rotation about said spindle member upon relative movement of well bore fluids past said impeller means;
 blade-positioning means including an actuating member coupled to said impeller blades and cooperatively arranged on said body for selective movement between one position operable for placing said impeller blades in their said operating positions and another position operable for placing said impeller blades in their said retracted positions;
 means on said body defining an outer lubricant chamber in communication with the exterior of said body; and
 passage means cooperatively arranged on said body for intercommunicating said inner and outer lubricant chambers and including at least one multidirectional portion adapted for at least retarding the movement of solid matter through said passage means into said inner lubricant chamber.

30. The well tool of claim 29 further including:
 centralizer means on said body and including a plurality of wall-engaging centralizing members cooperatively arranged around said body for simultaneous movement between retracted positions adjacent to said body and laterally extended positions for centering said body in a well bore of at least a selected diameter; and
 means cooperatively intercoupling said actuating member to at least one of said centralizing members for moving said actuating member to its said one position to extend said impeller blades upon extension of said one centralizing member and for moving said actuating member to its said other position to retract said impeller blades upon retraction of said one centralizing member.

31. The well tool of claim 30 wherein said centralizing members are cooperatively disposed around said impeller means for guarding said impeller blades.

32. The well tool of claim 29 further including:
 valve means cooperatively arranged between said body and said actuating member for selectively opening communication through said passage means upon movement of said actuating member to its said one position and for selectively closing communication through said passage means upon movement of said actuating member to its said other position.

33. The well tool of claim 32 further including:
 centralizer means on said body and including a plurality of outwardly biased bow spring centralizing members cooperatively arranged around said body for lateral movement between retracted positions adjacent to said body and extended wall-engaging positions for centering said body in a well bore of at least a selected diameter; and
 means cooperatively intercoupling said actuating member to at least one of said centralizing members for moving said actuating member to its said one position to extend said impeller blades upon extension of said one centralizing member and for moving said actuating member to its said other position to retract said impeller blades upon retraction of said one centralizing member.

34. The well tool of claim 33 wherein said centralizing members are cooperatively disposed around said impeller means and interconnected at their lower ends for guarding said impeller blades.

35. The well tool of claim 29 further including:
 circuit means on said body cooperatively arranged for producing electrical signals representative of the rotational speed of said impeller means.

* * * * *